United States Patent
Faruque et al.

(10) Patent No.: US 10,421,383 B2
(45) Date of Patent: Sep. 24, 2019

(54) COLLISION-RESPONSIVE TRAY TABLE FOR A VEHICLE SEAT

(71) Applicant: Ford Global Technologies, LLC, Dearborn, MI (US)

(72) Inventors: Mohammed Omar Faruque, Ann Arbor, MI (US); Agnes S. Kim, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 15/372,891

(22) Filed: Dec. 8, 2016

(65) Prior Publication Data

US 2018/0162253 A1 Jun. 14, 2018

(51) Int. Cl.
*B60N 2/42* (2006.01)
*B60N 3/00* (2006.01)
*B60N 2/427* (2006.01)

(52) U.S. Cl.
CPC ............... *B60N 3/004* (2013.01); *B60N 2/42* (2013.01); *B60N 2/42781* (2013.01)

(58) Field of Classification Search
CPC ........ B60N 2/42; B60N 2/4221; B60N 2/427; B60N 2/42772; B60N 2/42781; B60N 3/001; B60N 3/002; B60N 3/004
See application file for complete search history.

(56) References Cited

U.S. PATENT DOCUMENTS

| | | | |
|---|---|---|---|
| 5,046,433 A | 9/1991 | Kramer et al. | |
| 5,370,060 A | 12/1994 | Wang | |
| 7,281,762 B1 | 10/2007 | Getfield | |
| 8,881,659 B2 | 11/2014 | Ackeret et al. | |
| 2003/0106469 A1* | 6/2003 | Jensen | B60N 3/004 108/44 |
| 2006/0214479 A1* | 9/2006 | Dwire | B60N 3/004 297/163 |
| 2011/0155024 A1 | 6/2011 | McCaffrey et al. | |
| 2018/0099598 A1* | 4/2018 | Hansen | B60N 2/64 |

FOREIGN PATENT DOCUMENTS

| | | | | |
|---|---|---|---|---|
| DE | 29621991 U1 * | 3/1997 | ............. | B60N 3/004 |
| DE | 10333912 A1 * | 2/2005 | ............. | B60N 3/004 |
| FR | 2802070 A1 * | 6/2001 | ............... | A47B 5/00 |
| WO | WO-2016089759 A1 * | 6/2016 | ............. | B60N 3/004 |
| WO | WO-2017034624 A1 * | 3/2017 | ............. | B60N 3/004 |

OTHER PUBLICATIONS

Machine Translation of DE 296 21 99, file:///C:/Users/rkwiecinski/Documents/e-Red%20Folder/15372891/DE29621991_Machine.pdf; Jan. 2, 2019 (Year: 2019).*

* cited by examiner

*Primary Examiner* — Ryan D Kwiecinski

(74) *Attorney, Agent, or Firm* — Vichit Chea; Price Heneveld LLP

(57) ABSTRACT

A vehicle includes a seatback having a rear-mounted and rotationally operable tray table selectively operable between a plurality of rotational positions. An actuator is coupled to the seatback and the tray table, wherein in response to a decelerating impact, the actuator applies a generally downward force that biases the tray table toward a safety position against a back surface of the seatback.

18 Claims, 8 Drawing Sheets

US 10,421,383 B2

COLLISION-RESPONSIVE TRAY TABLE FOR A VEHICLE SEAT

FIELD OF THE INVENTION

The present invention generally relates to tray tables incorporated within a seatback of a vehicle, and more specifically, a tray table for a vehicle seat that operates in response to a decelerating impact, such as a frontal collision.

BACKGROUND OF THE INVENTION

Various vehicles include tray tables that are installed within a seatback of the vehicle seat. These tray tables serve rear seating positions, such as second row or third row seating positions within a passenger cabin. These tray tables are typically operable between a plurality of rotational positions that can be used as a work surface within the vehicle, or stowed away when not in use.

SUMMARY OF THE INVENTION

According to one aspect of the present invention, a vehicle includes a seatback having a rear-mounted and rotationally operable tray table selectively operable between a plurality of rotational positions. An actuator is coupled to the seatback and the tray table, wherein in response to a decelerating impact, the actuator applies a generally downward force that biases the tray table toward a safety position against a back surface of the seatback.

According to another aspect of the present invention, a vehicle seat includes a tray table rotationally coupled to a seatback and selectively operable between platform and storage positions. An actuator is coupled to the tray table, wherein in response to a decelerating impact and when the tray table is in the platform position, the actuator rotates the tray table into the safety position.

According to another aspect of the present invention, a method of operating a vehicle seat includes communicating an occurrence of a decelerating impact to an actuator coupled to a vehicle seat and a tray table. The method also includes activating the actuator in response to the decelerating impact, wherein activation of the actuator generates a generally downward force. The method also includes translating the generally downward force into a generally lateral force. The method also includes applying the generally lateral force to the tray table to bias the tray table toward a back surface of a seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
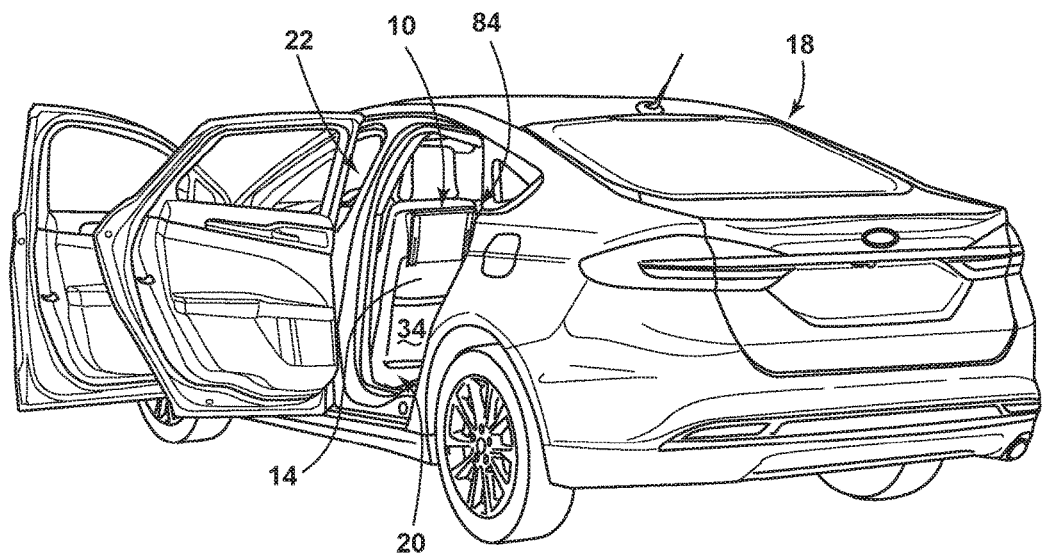
FIG. 1 is a side perspective view of a vehicle having vehicle seats that incorporate an aspect of the collapsible tray table.
Figure 2:
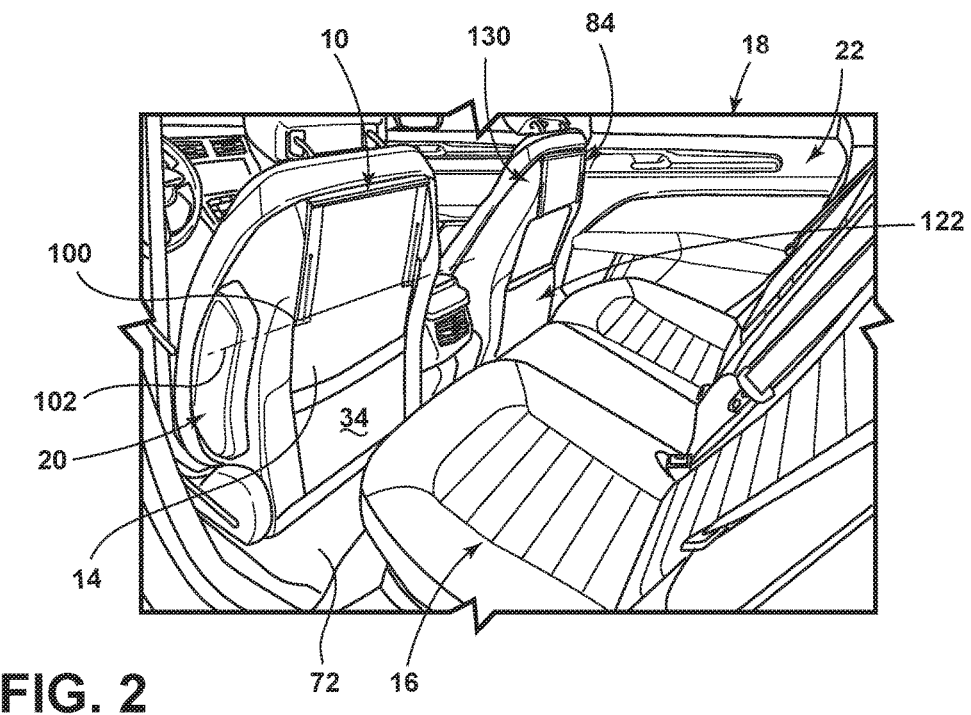
FIG. 2 is a perspective view of the passenger cabin of the vehicle of FIG. 1 and showing tray tables in a storage position.
Figure 3:
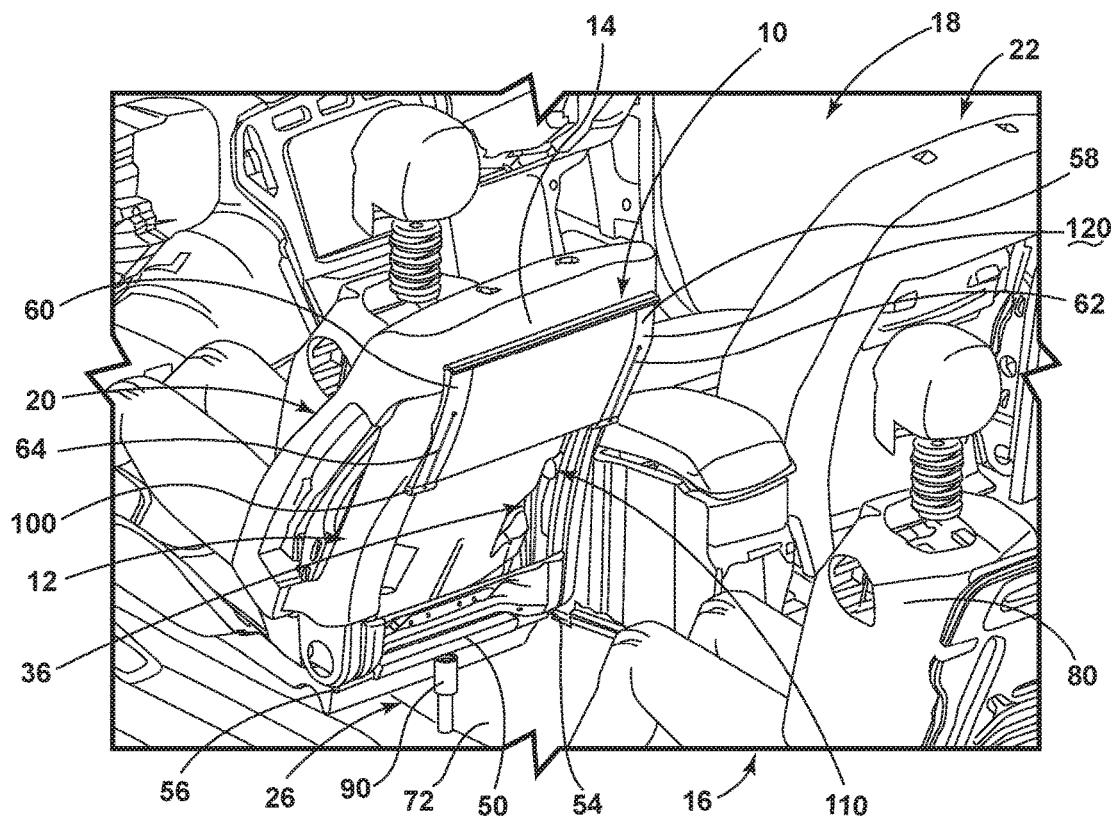
FIG. 3 is a perspective view of a vehicle incorporating an aspect of the collapsible tray tables, with the tray tables in a storage position.
Figure 4:
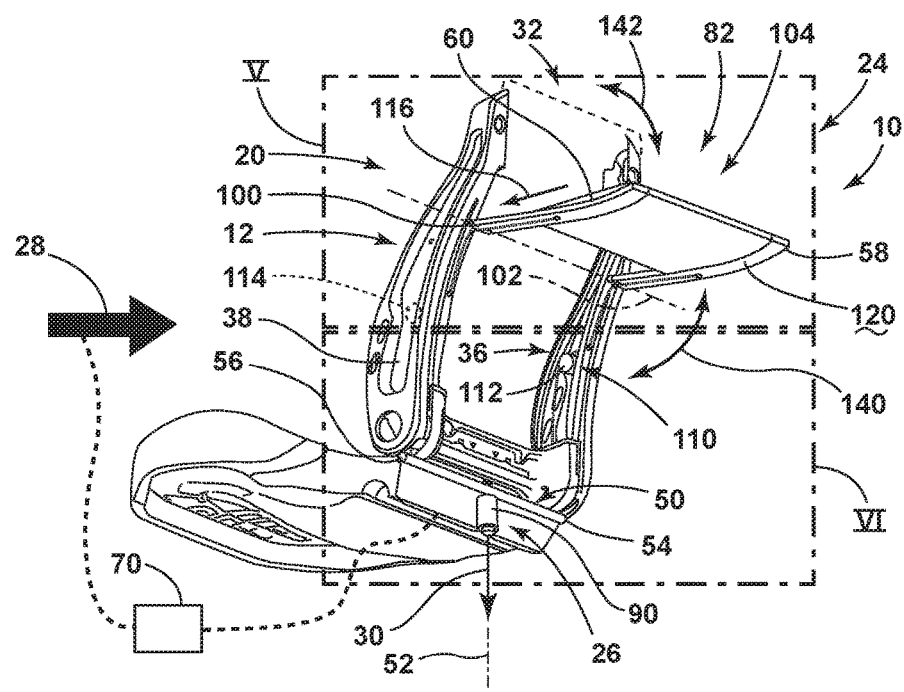
FIG. 4 is a bottom perspective view of a frame for a vehicle seat incorporating an aspect of the collapsible tray table and illustrating the collapsible tray table in a platform position.
Figure 5:
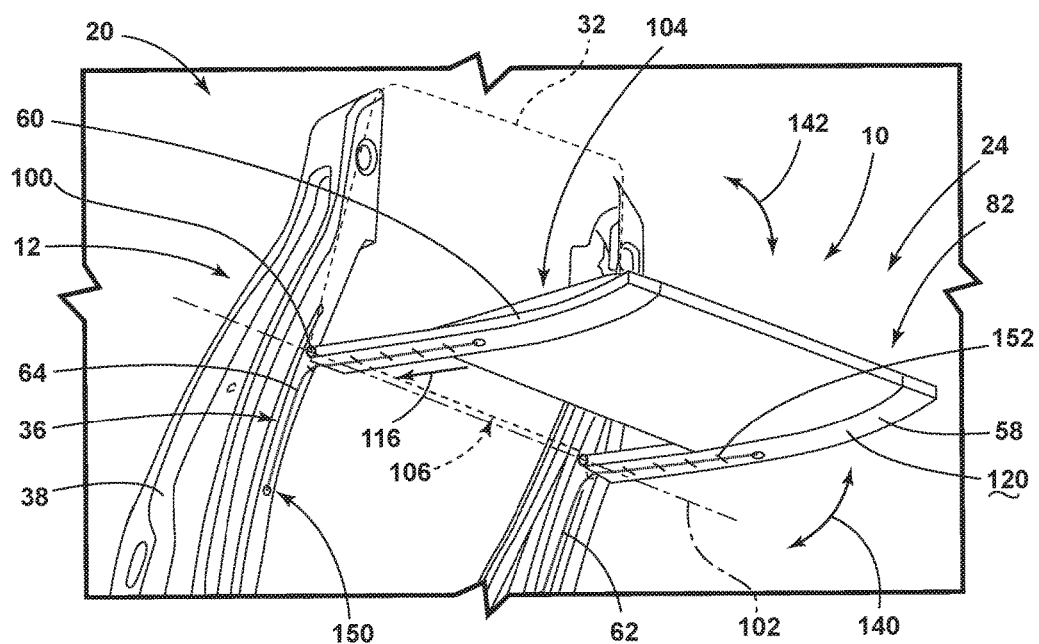
FIG. 5 is an enlarged perspective view of a frame of FIG. 4, taken at area V.
Figure 6:
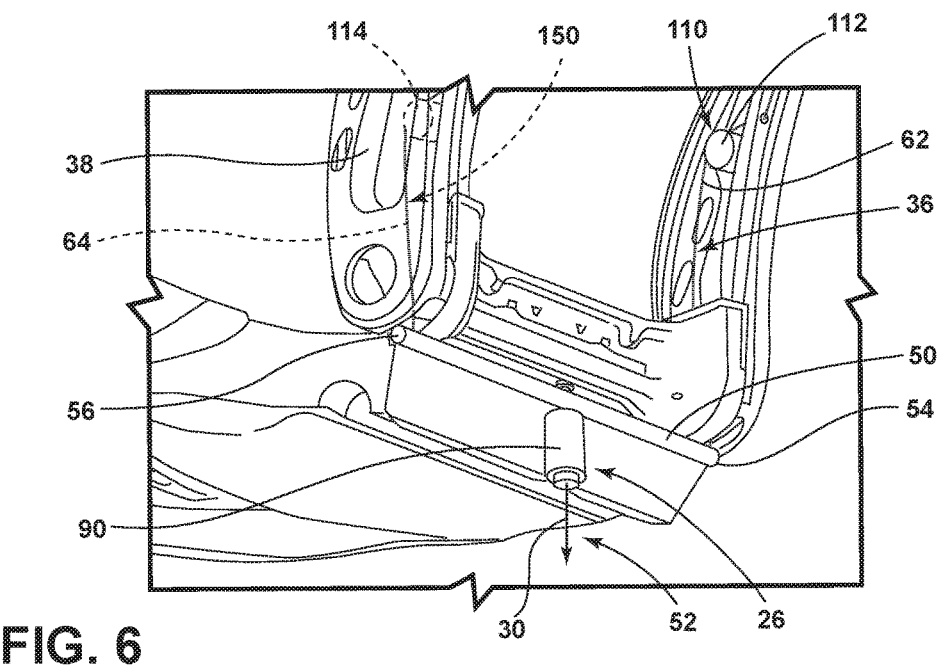
FIG. 6 is an enlarged perspective view of a frame of FIG. 4, taken at area VI.
Figure 7:
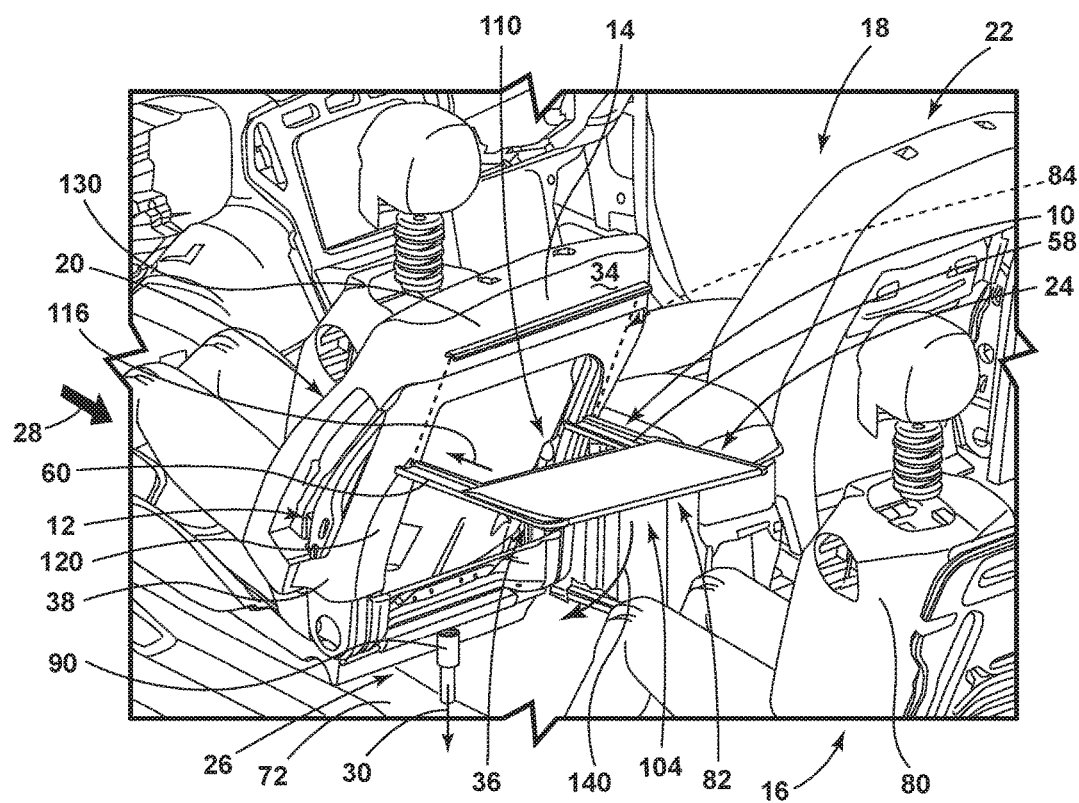
FIG. 7 is a perspective view of the vehicle of FIG. 3 showing the collapsible tray table in the platform position.
Figure 8:
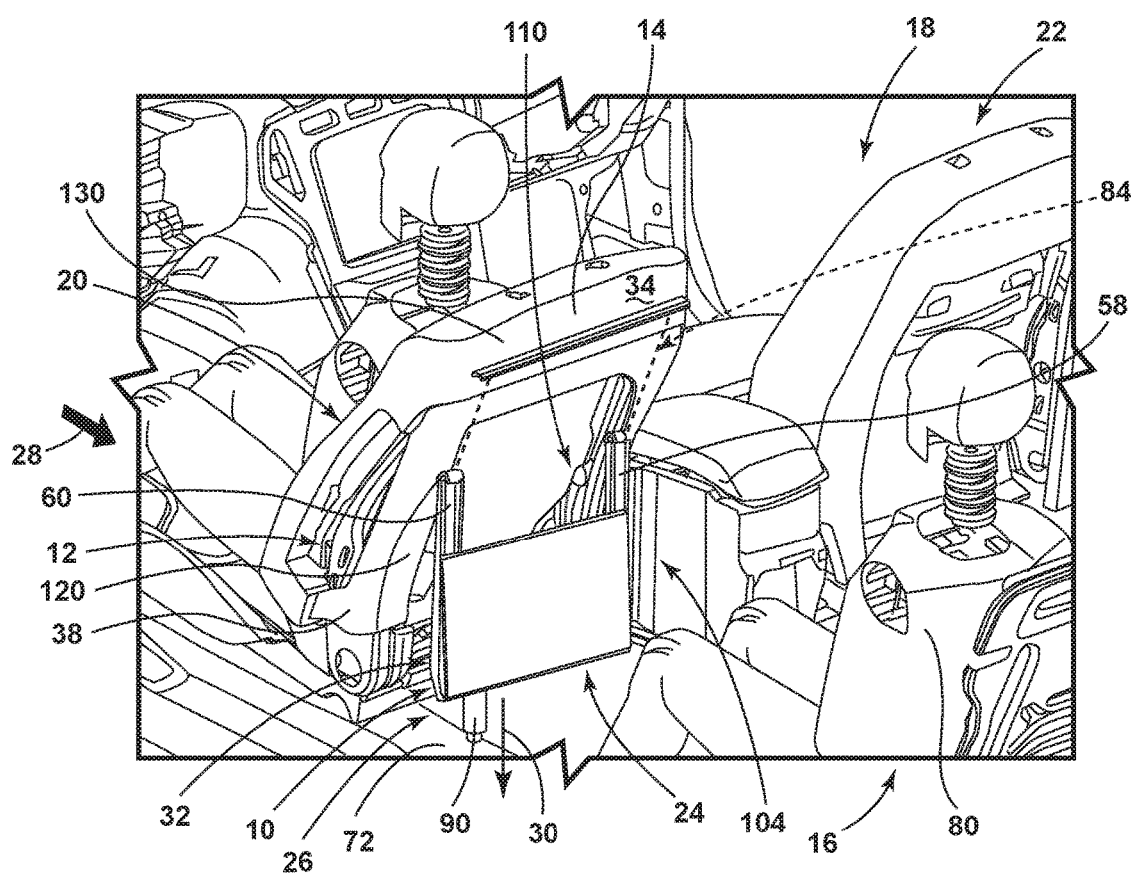
FIG. 8 is a perspective view of the vehicle of FIG. 7, showing the collapsible tray table being moved into a safety position in response to a decelerated impact.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to a collapsible tray table that is incorporated within a frame 12 of a seatback 14 for a seating position 16 of a vehicle 18. According to the various embodiments, the vehicle 18 can include a seat 20 disposed within the passenger cabin 22 of the vehicle 18, the seat 20 including a seatback 14 having a rear mounted, rotationally operable tray table 10. The tray table 10 is selectively operable between a plurality of rotational positions 24. An actuator 26 is coupled to at least one of a seatback 14 and a frame 12 of the seat 20, and is also coupled to the tray table 10. In response to a decelerating impact 28, the actuator 26 is activated and applies a generally downward force 30 that biases the tray table 10 toward a safety position 32. It is contemplated that the safety position 32 of the tray table 10 is against the back surface 34 of the seatback 14. According to the various embodiments, a cable assembly 36 is adapted to extend from the actuator 26 to the tray table 10. In such an embodiment, the downward force 30 of the actuator 26 is translated to the tray table 10 via the cable assembly 36.

Referring again to FIGS. 1-8, the actuator 26 can include an actuator bar 50 that extends generally perpendicular from an axis of movement 52 of the actuator 26. The actuator bar 50 can include first and second ends 54, 56 that extend outward from portions of the actuator 26. In such an embodiment, the downward force 30 generated through activation of the actuator 26 is translated from the actuator 26 and the first and second ends 54, 56 of the actuator bar 50 and to corresponding first and second arms 58, 60 of the tray table 10. This downward force 30 is translated to first and second arms 58, 60 of the tray table 10 via respective first and second ends 54, 56 of the actuator bar 50. In various embodiments, a first cable 62 can extend from the first end 54 of the actuator bar 50 to the first arm 58. Similarly, a second cable 64 can extend from the second end 56 of the actuator bar 50 to the second arm 60. In this embodiment, the downward force 30 of the actuator 26 is translated to the tray table 10 via the first and second cables 62, 64. The use of the actuator bar 50 can maintain the position of the first and second cables 62, 64 toward the sides 38 of the seat 20. In this manner, the path of the cables 62, 64 can be directed along portions of the frame 12 of the seat 20. Accordingly, the frame 12 can serve to guide and at least pivotally conceal the first and second cables 62, 64 during use and non-use.

In operation, upon the occurrence of a decelerating impact 28, a controller 70, such as a restraint control module (RCM) communicates with the actuator 26. Where the decelerating impact 28 is of a sufficient force, the RCM activates the actuator 26 to generate the downward force 30. This downward force 30 is transferred to the actuator bar 50 that moves in a generally downward direction and toward the floor 72 of the passenger cabin 22. The downward force 30 is then transferred through the first and second cables 62, 64 and up to the first and second arms 58, 60, respectively, of the collapsible tray table 10. In this manner, the downward force 30 exerted by activation of the actuator 26 is transferred to the tray table 10 to operate and/or bias the tray table 10 toward a safety position 32.

Operation of the tray table 10 toward the safety position 32 can be used to manipulate the tray table 10 out of a position in front of an occupant 80 of the vehicle 18. Accordingly, during the decelerating impact 28, such as a frontal collision involving the vehicle 18, the occupant 80 may be moved, as a result of inertia, in a generally forward direction and toward the collapsible tray table 10. Activation of the actuator 26 and translation of the downward force 30 into the tray table 10 causes the tray table 10 to be biased toward the safety position 32. When the tray table 10 is in the platform position 82, translation of the downward force 30 to the tray table 10 moves the tray table 10 toward the safety position 32 such that when the occupant 80 moves toward the seatback 14, the tray table 10 is already moved into the safety position 32 and out of the way of potential movements of the occupant 80 during the decelerating impact 28.

Referring again to FIGS. 1-8, it is contemplated that the actuator 26 can be in the form of a pre-tensioner 90. This pre-tensioner 90 can include a spring-loaded device, a small explosive device, or similar pre-tensioning mechanism that can exert the generally linear and generally downward force 30 in an expedient manner. Once the RCM of the vehicle 18 identifies the decelerating impact 28, the RCM activates the pre-tensioner 90 to generate the downward force 30 that moves the tray table 10 to the safety position 32. This series of events can occur within fractions of a second. Accordingly, by the time portions of the body of the occupant 80 move in a forward direction as a result of decelerating impact 28, the collapsible tray table 10 is already in the safety position 32, such that a potential impact between the occupant 80 and the collapsible tray table 10 can be substantially avoided.

Referring again to FIGS. 1-8, the collapsible tray table 10 can be rotationally operable relative to the seatback 14 and may be attached to the seatback 14 at a pivot 100 having a horizontal rotational axis 102 around which the collapsible tray table 10 can operate. The tray table 10 can be positioned in a platform position 82 in front of a rear seating position 16 to be used as workspace during use of the vehicle 18. From the platform position 82, it is contemplated that the tray table 10 can move either upward, downward or both to be placed in a storage position 84 and out of the way of the occupant 80 during non-use. It is also contemplated that the tray table 10 can be slidably operated relative to the first and second arms 58, 60, such that the tray table 10 can be slidably operated between extended and retracted positions 104, 106 along the first and second arms 58, 60 relative to the seatback 14. During each of these operational movements of the tray table 10 and first and second arms 58, 60, it is contemplated that the first and second cables 62, 64 can be simultaneously operated to maintain an at least partial tension relative to the first and second arms 58, 60. This at least partial tension provides for controlled movement of the tray table 10 about the pivot 100 and also through the extension and retraction of the tray table 10 relative to the seatback 14. By maintaining the first and second cables 62, 64 in an at least partially tensioned configuration, operation of the actuator 26 can apply the downward force 30 directly to operation of the tray table 10 toward the safety position 32. By maintaining an at least partially tensioned configuration of the first and second cables 62, 64, the downward force 30 is not directed toward taking up substantial amounts of slack within the cable assembly 36 that might arise as the result of operation of the tray table 10 throughout the various typical operational movements during use of the tray table 10.

Referring again to FIGS. 1-8, it is contemplated that the cable assembly 36 can include a pulley mechanism 110 disposed proximate a frame 12 of the seatback 14. This pulley mechanism 110 can include a first pulley 112 that corresponds to a first cable 62 and a second pulley 114 that corresponds to a second cable 64. It is contemplated that the pulley mechanism 110 can be adapted to translate the generally downward force 30 of the actuator 26 into a generally lateral force 116 that extends from the pulley mechanism 110 toward the first and second arms 58, 60 of the tray table 10. By translating force in this manner, the generally lateral force 116 exerted upon the tray table 10 can be directed to operate the tray table 10, or bias the tray table 10 toward the safety position 32.

Referring again to FIGS. 1-8, it is contemplated that the first and second cables 62, 64 can attach to the first and second arms 58, 60, respectively, proximate lower surfaces 120 of the first and second arms 58, 60 of the tray table 10. In such an embodiment, the downward force 30 of the actuator 26 is translated through the first and second the cables 62, 64. This downward force 30 is translated into a generally horizontal force or lateral force 116 as the cable is wrapped at least partially around the pulley mechanism 110. In such an embodiment, the lateral force 116, along with a partially downward force 30, is exerted upon the first and second arms 58, 60 of the tray table 10 and causes a downward rotation 140 of the tray table 10 toward the safety position 32. The safety position 32, in such an embodiment, is defined by the tray table 10 being positioned against a lower portion 122 of the back surface 34 of the seatback 14. As discussed above, the rotational operation of the tray table 10 toward the safety position 32 can be combined with a slidable operation of the tray table 10 such that as the tray table 10 rotates toward the safety position 32, the tray table 10 is also retracted toward the pivot 100 along the first and second arms 58, 60.

Figure 9:
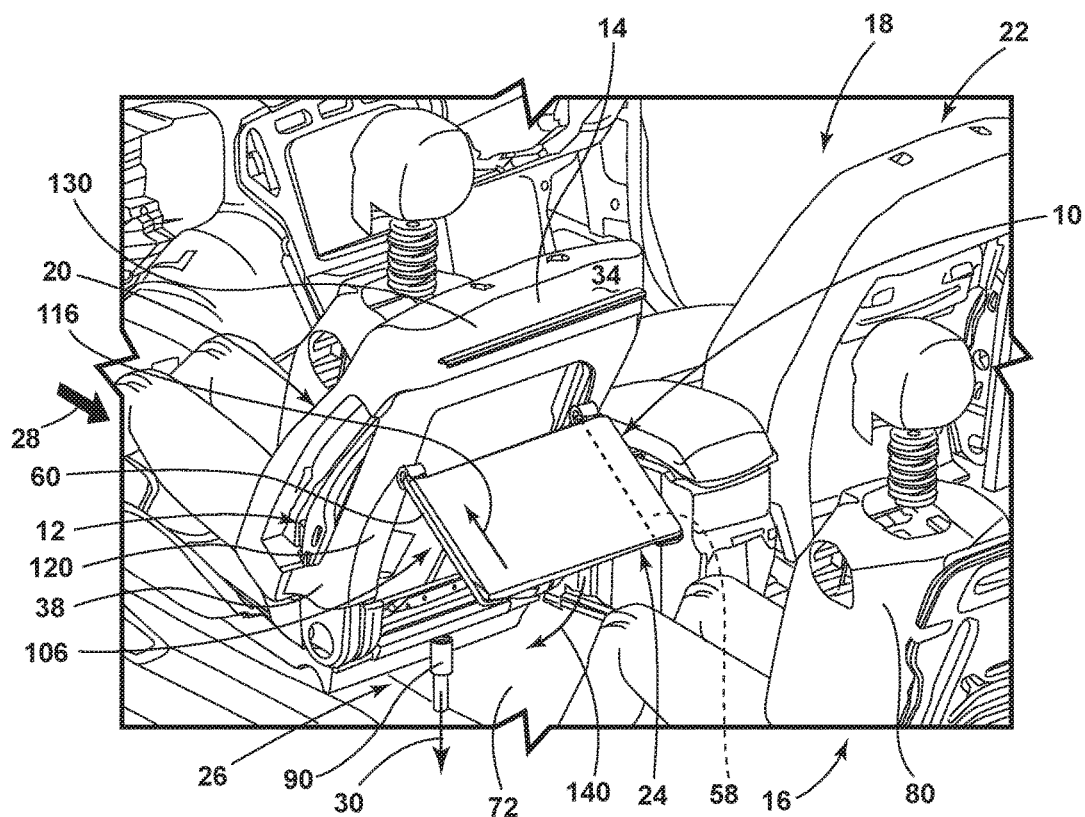
FIG. 9 is a top perspective view of the vehicle of FIG. 7 showing an aspect of the collapsible tray table moving into the collapsed position.
Figure 10:
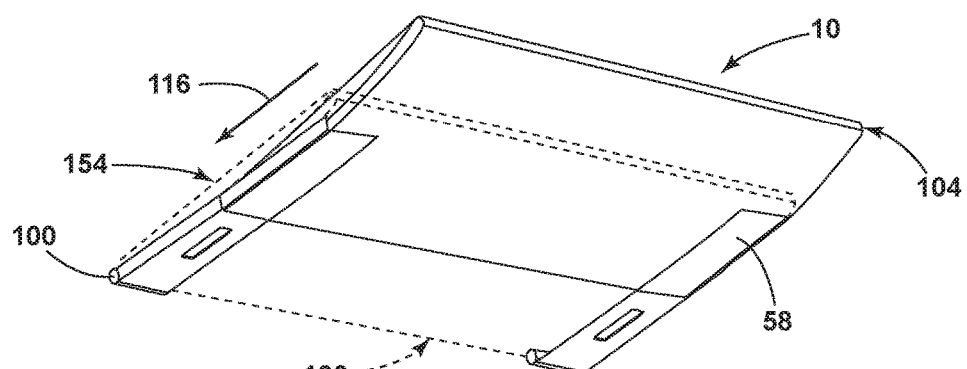
FIG. 10 is a bottom perspective view of the collapsible tray table.
Figure 11:
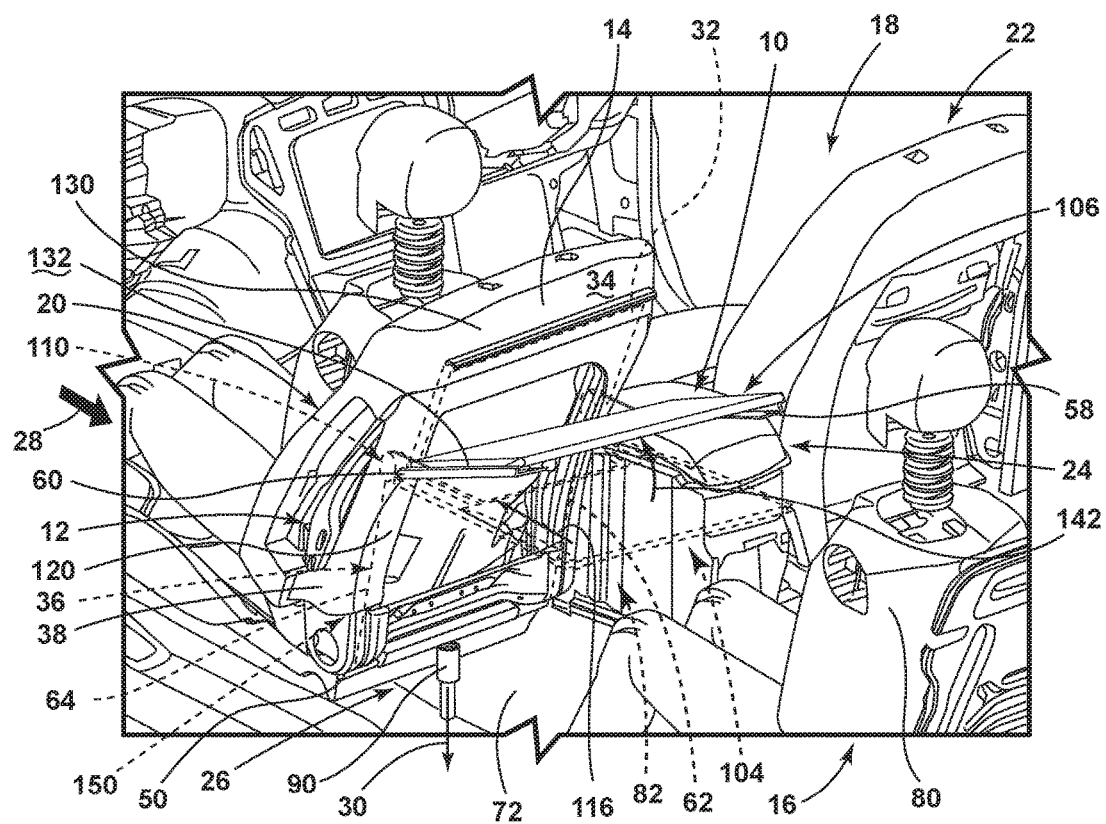
FIG. 11 is a top perspective view of the vehicle of FIG. 7 showing an aspect of a collapsible tray table moving to the safety position.
Figure 12:
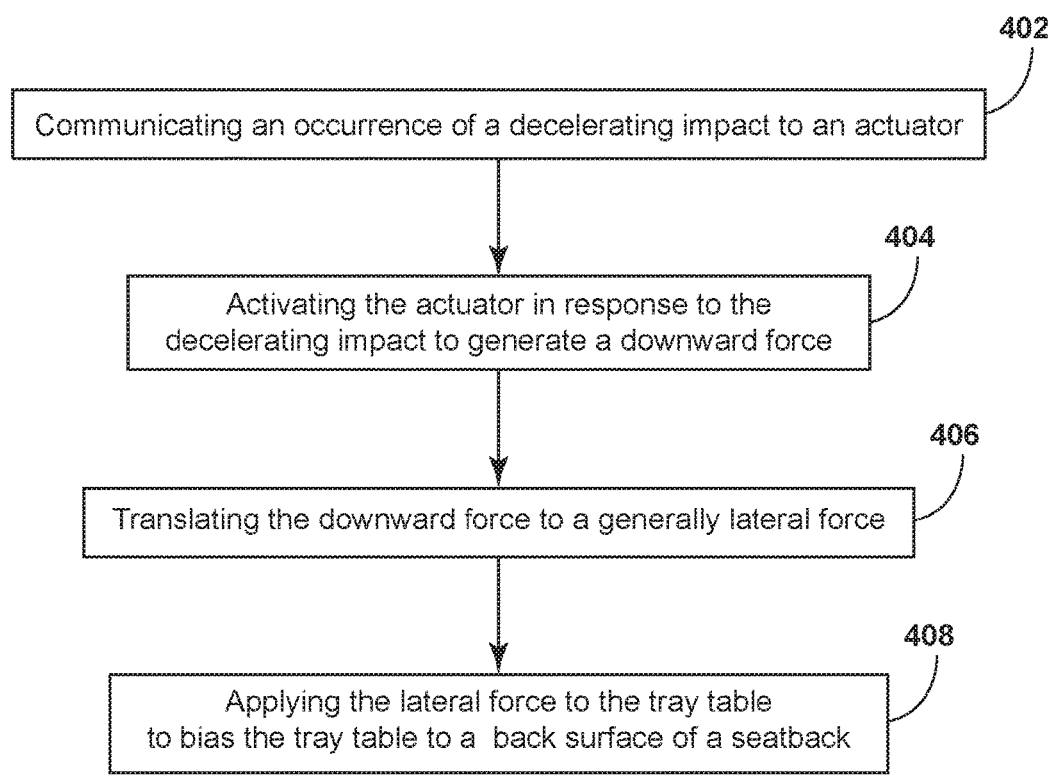
FIG. 12 is a schematic flow diagram illustrating a method for operating a seat.

Referring now to FIGS. 9-11, the use of the pulley mechanism 110, by way of example and not limitation, may also be implemented where the safety position 32 is defined by the tray table 10 being positioned against an upper portion 130 of a back surface 34 of the seatback 14. In such an embodiment, the first and second cables 62, 64 extend over the first and second pulleys 112, 114 of the pulley mechanism 110 and engage top surfaces 132 of the first and second arms 58, 60 of the tray table 10. When the actuator 26 is activated, the downward force 30 generated by the actuator 26 causes a downward movement of the first and second cables 62, 64 proximate the actuator bar 50. Because the first and second cables 62, 64 wrap at least partially around the pulley mechanism 110, the pulley mechanism 110 can translate this downward force 30 into a generally lateral force 116 that pulls, in a generally lateral direction, and a partially vertical direction, against the first and second arms 58, 60 to manipulate the tray table 10 in a generally upward rotation 142. According to the various embodiments, this operation of the cables 62, 64 can also slide the tray table 10 in a retraction-type motion toward the seatback 14, such that the tray table 10 is rotationally operated about the pivot 100 and, simultaneously, slidably operated toward the seatback 14, as the tray table 10 is moved to the safety position 32.

Referring now to FIGS. 1-11, the safety position 32 can be defined by either upward or downward rotation 142, 140 of the tray table 10 with respect to the platform position 82. The direction of movement of the tray table 10 to define the safety position 32 can be defined by the placement of the pulley mechanism 110, with respect to the pivot 100. As discussed above, placement of the pulley mechanism 110 above the pivot 100 can typically correspond to an upward rotation 142 of the tray table 10 toward the safety position 32 against an upper portion 130 of the back surface 34 of the seatback 14. Conversely, placement of the pulley mechanism 110 below the pivot 100 typically corresponds to a downward rotation 140 of the seatback 14 to a safety position 32 against a lower portion 122 of the back surface 34 of the seatback 14.

Referring again to FIGS. 1-11, the vehicle seat 20 disposed within the passenger cabin 22 can include a tray table 10 that is rotationally coupled to the seatback 14. A collapsible tray table 10 is selectively operable between platform and storage positions 82, 84. As discussed above, the platform position 82 is typically defined by the tray table 10 extending toward a rear seating position 16 to the rear of the seatback 14. Conversely, the storage position 84 of the tray table 10 is defined by the tray table 10 being disposed against an upper portion 130 or lower portion 122 of the back surface 34 of the seatback 14. The vehicle seat 20 can also include the actuator 26 that is coupled to the tray table 10. In response to a decelerating impact 28 and when the tray table 10 is in the platform position 82 or distal from the storage position 84, the actuator 26 serves to rotate the tray table 10 into the safety position 32.

As discussed above, operation of the actuator 26 when the tray table 10 is in the storage position 84 can result in the tray table 10 being further biased against the back surface 34 of the seatback 14. Such configuration can be useful to prevent unwanted rotation of the tray table 10 out of the storage position 84 during the decelerating impact 28. Conversely, operation of the tray table 10 to the storage position 84 can have the effect of deactivating the actuator 26. In such an embodiment, placement of the tray table 10 from the storage position 84 prevents actuation of the actuator 26 during the decelerating impact 28.

According to various embodiments, it is contemplated that the storage position 84 and the safety position 32 can be one and the same. Alternatively, it is contemplated that the storage position 84 can be a downward rotation 140 to place the tray table 10 against the lower portion 122 of the back surface 34 of the seatback 14, while the safety position 32 can be defined by an upward rotation 142 of the tray table 10 to place the tray table 10 against an upper portion 130 of the back surface 34 of the seatback 14, or vice versa.

Referring again to FIGS. 3-11, it is contemplated that operation of the actuator 26 applies a generally downward force 30 to a cable assembly 36 that can include first and second cables 62, 64 that extend from the actuator bar 50 up to the first and second arms 58, 60 of the tray table 10. This downward force 30 exerted through the first and second cables 62, 64 applies at least the rotational force to the first and second arms 58, 60 of the tray table 10 via the first and second cables 62, 64. Accordingly, the first and second cables 62, 64 operate the tray table 10 from the platform position 82 to the safety position 32, or simply bias the tray table 10 toward the safety position 32. It is contemplated that the first and second cables 62, 64 can be manipulated through operation of the pulley mechanism 110 to translate the downward force 30 of the actuator 26 to a generally lateral force 116 that can be exerted onto the first and second arms 58, 60. This generally lateral force 116 typically includes a component of an at least partially upward or downward force 30, acting in conjunction with the lateral force 116 that serves to operate the tray table 10 toward the safety position 32. Additionally, and as discussed above, the generally lateral force 116 exerted by the first and second cables 62, 64 onto the first and second arms 58, 60 can also slidably operate the tray table 10 along the first and second arms 58, 60 and toward the pivot 100 proximate the back surface 34 of the seatback 14. In this manner, the first and second cables 62, 64 can apply a simultaneous or substantially simultaneous sliding and rotational force that can be exerted upon the tray table 10 to move the tray table 10 toward the safety position 32. It is contemplated that the safety position 32 can be disposed against an upper or lower portion 130, 122 of the back surface 34 of the seatback 14. Additionally, the safety position 32 can be configured such that a back edge of the seatback 14 is slidably operated along the first and second arms 58, 60 to be adjacent the pivot 100 of the collapsible tray table 10.

To initiate operation of the actuator 26, the decelerating impact 28 can be in the form of a frontal collision, rear collision, or other collision that may exert the decelerating impact 28 or similar force that would cause the RCM to activate the actuator 26 to operate the tray table 10 toward the safety position 32. Typically, the decelerating impact 28 is a generally frontal collision that can also be a side impact, diagonal impact, rear impact, crush-type impact, or other similar impact that might cause the occupant 80 of a rear seating position 16 to move toward the seatback 14 in front of that particular seating position 16.

Referring now to FIGS. 1-12, having described various aspects of the actuator 26 and collapsible tray table 10, a method 400 is disclosed for operating a tray table 10 for a vehicle seat 20. The method 400 includes steps of communicating an occurrence of a decelerating impact 28 to an actuator 26 coupled to a vehicle seat 20 and tray table 10 (step 402). As discussed above, the controller 70 can deliver a communication to the actuator 26, where the controller 70 can be the RCM for operating the various restraints of the vehicle 18. Upon occurrence of a sufficient decelerating impact 28 that generates a predetermined amount of inertia on the occupant 80 relative to the vehicle 18, the RCM activates the actuator 26 in response to a decelerating impact 28 (step 404). Activation of the actuator 26 generates the generally downward force 30. This downward force 30 is then translated into a generally lateral force 116 (step 406). This generally lateral force 116 may be lateral or may include a vertical component. This generally lateral force 116 is translated from the actuator 26 to the collapsing tray table 10. The generally lateral force 116 is then applied to the tray table 10 to bias the tray table 10 toward a back surface 34 of the seatback 14 (step 408). As discussed above, the step 406 of translating the generally downward force 30 into the generally lateral force 116 is performed by a cable assembly 36 that extends between the actuator 26 and a portion of the tray table 10. The cable assembly 36 can include a pulley mechanism 110, wherein at least one cable of the assembly 36 extends around the pulley mechanism 110. As the cable assembly 36 extends around the pulley mechanism 110, the generally downward force 30 is translated, modulated or otherwise modified into a generally lateral force 116 that is exerted upon the tray table 10 to manipulate the tray table 10 toward the safety position 32, or bias the tray table 10 toward the safety position 32.

According to various embodiments, the first and second cables 62, 64 can be attached to the first and second arms 58, 60 through various fasteners 152 that extend along the top or lower surface 132, 120 of the first and second arms 58, 60, depending upon the configuration of the collapsible tray table 10. These fasteners 152 can be of sufficient strength to maintain engagement between the first and second cables 62, 64 and the first and second arms 58, 60 such that upon activation of the actuator 26, the generally downward force 30, which is translated to the generally lateral force 116, can be applied to the tray table 10, to operate the tray table 10 toward the safety position 32, without disengaging the first and second cables 62, 64 from the tray table 10.

According to the various embodiments, it is contemplated that the cable assembly 36 can be attached to the actuator bar 50, or can be attached directly to the actuator 26, typically in the form of a pre-tensioner 90. In these various embodiments, the pre-tensioner 90, when activated, exerts the downward force 30 that is transferred into the first and second cables 62, 64 and delivered to the tray table 10 for operation of the tray table 10 to the safety position 32.

According to the various embodiments, the pulley mechanism 110 can be used in conjunction with a cable path 150 that extends through a portion of the frame 12 of the seatback 14. This cable path 150 can be used to maintain the cable assembly 36 in close contact with the frame 12. This close contact can achieve concealment of the cable assembly 36 and can also define a predetermined trajectory of the various downward and lateral forces 30, 116 exerted upon the tray through activation of the pre-tensioner 90. In various embodiments, at least one of the fasteners 152 that attach the cable assembly 36 to the tray table 10 can be adapted to selectively disengage upon activation of the pre-tensioner 90. In such an embodiment, the fasteners 152 are adapted to conceal the cable from view. Upon the occurrence of a decelerating impact 28, and activation of the pre-tensioner 90, the downward force 30 exerted upon the first and second cables 62, 64 is sufficient to disengage the fastener 152, such that a more direct force can be applied to the first and/or second arms 58, 60 of the tray table 10. These fasteners 152 can also provide for sliding operation of the cable relative to the tray table 10, such that the tray tables 10 can accomplish the sliding movement 154 of the tray table 10 toward the pivot 100 to achieve the safety position 32 of the tray table 10.

According to the various embodiments, the collapsible tray table 10 and actuator 26 can be positioned in various seating positions 16 of the passenger cabin 22 of the vehicle 18. Such seating positions 16 can include, but are not limited to, second row seating positions 16, third row seating positions 16, a passenger seat 20 within a front row of a vehicle 18, and other similar seating positions 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a seatback having a rear-mounted and rotationally operable tray table selectively operable between a plurality of rotational positions;
   an actuator coupled to the seatback and the tray table, wherein the actuator selectively defines a generally downward force that biases the tray table toward a safety position against a back surface of the seatback; and
   a cable assembly that extends from the actuator to the tray table, the generally downward force of the actuator being translated to the tray table via the cable assembly, wherein the actuator is configured to define the generally downward force in response to a predetermined frontal decelerating impact.

2. The vehicle of claim 1, wherein the actuator includes an actuator bar having first and second ends, wherein the downward force is translated from the actuator to first and second arms of the tray table via the respective first and second ends of the actuator bar.

3. The vehicle of claim 2, wherein a first cable extends from the first end of the actuator bar to the first arm and a second cable extends from the second end of the actuator bar to the second arm, and wherein the downward force of the actuator is translated to the tray table via the first and second cables.

4. The vehicle of claim 3, wherein the first and second cables engage a pulley mechanism disposed within the seatback, wherein the pulley mechanism translates the generally downward force of the actuator into a generally lateral force that biases the tray table toward the safety position.

5. The vehicle of claim 3, wherein the first and second cables attach proximate lower surfaces of the first and second arms of the tray table.

6. The vehicle of claim 1, wherein the safety position is defined by the tray table being positioned against a lower portion of the back surface of the seatback.

7. A vehicle seat comprising:
   a tray table rotationally coupled to a seatback and selectively operable between platform and storage positions; and
   an actuator coupled to the tray table, wherein the actuator selectively rotates the tray table from the platform position to a safety position, wherein the safety position is defined by the tray table being positioned against an upper portion of a back surface of the seatback, and wherein the actuator is configured to selectively rotate the tray table in response to a sufficient frontal decelerating impact.

8. The vehicle seat of claim 7, wherein the safety position is the storage position.

9. The vehicle seat of claim 7, wherein the actuator is coupled with a frame of the seatback and includes an actuator bar having first and second ends, wherein first and second cables extend from the first and second ends, respectively, to corresponding first and second arms of the tray table.

10. The vehicle seat of claim 9, wherein operation of the actuator applies a downward force to the first and second cables, and wherein the downward force of the actuator applies at least a rotational force to the first and second arms of the tray table via the first and second cables to operate the tray table from the platform position to the safety position.

11. The vehicle seat of claim 10, wherein the first and second cables extend around respective first and second pulleys that are disposed within the seatback, wherein the first and second pulleys translate the downward force from the actuator into a generally lateral force that biases the tray table toward a back surface of the seatback.

12. The vehicle seat of claim 11, wherein when the tray table is in the platform position, the generally lateral force slidably operates the tray table along the first and second arms and toward the back surface of the seatback and also applies a rotational force that rotates the first and second arms and the tray table about a pivot and into the safety position.

13. The vehicle seat of claim 11, wherein the first and second cables attach proximate upper surfaces of the first and second arms of the tray table.

14. The vehicle seat of claim 7, wherein the frontal decelerating impact is a generally frontal collision.

15. The vehicle seat of claim 7, wherein the actuator is a pre-tensioner.

16. A method of operating a vehicle seat, the method comprising steps of:
communicating an occurrence of a frontal decelerating impact of a predetermined magnitude an actuator coupled to the vehicle seat and a tray table;
activating the actuator in response to the frontal decelerating impact, wherein activation of the actuator generates a generally downward force;
translating the generally downward force into a generally lateral force; and
applying the generally lateral force to the tray table to bias the tray table toward a back surface of a seatback.

17. The method of claim 16, wherein the step of translating the generally downward force into the generally lateral force is performed by a cable assembly that extends between the actuator and a portion of the tray table.

18. The method of claim 17, wherein the cable assembly includes a pulley mechanism, wherein at least one cable of the cable assembly extends around the pulley mechanism.

\* \* \* \* \*